United States Patent [19]

Southard

[11] Patent Number: 4,656,984
[45] Date of Patent: Apr. 14, 1987

[54] ROTARY INTERNAL COMBUSTION ENGINE WITH INTEGRATED SUPERCHARGED FUEL-AIR INDUCTION

[76] Inventor: Albert A. Southard, R.R. #3, Council Grove, Kans. 66846

[21] Appl. No.: 201,352

[22] Filed: Oct. 27, 1980

Related U.S. Application Data

[63] Continuation of Ser. No. 944,850, Sep. 22, 1978, Pat. No. 4,230,088.

[51] Int. Cl.$^4$ .............................................. F02B 53/06
[52] U.S. Cl. .................................... 123/202; 123/203; 123/212; 123/213; 123/220
[58] Field of Search ............... 123/202, 203, 212, 213, 123/220

[56] References Cited

U.S. PATENT DOCUMENTS

| | | | |
|---|---|---|---|
| 3,097,632 | 7/1963 | Froede | 123/213 |
| 3,168,078 | 2/1965 | Lamm | 123/202 |
| 3,319,611 | 5/1967 | Terazawa | 123/220 |
| 3,359,954 | 12/1967 | Eiermann | 123/213 |
| 3,647,327 | 3/1972 | Manthey | 123/203 |
| 3,872,839 | 3/1975 | Russell | 123/220 |
| 3,945,345 | 3/1976 | Ishikawa | 123/203 |

FOREIGN PATENT DOCUMENTS 1,300,123  7/1969  Germany ............................ 123/242

Primary Examiner—Douglas Hart
Attorney, Agent, or Firm—Robert E. Breidenthal

[57] ABSTRACT

An improved "Wankel-type" rotary engine wherein the same trochoidal cavity employed for effecting a four-phase internal combustion engine operation is also employed to perform a supercharging function in that air is compressed in one chamber (chambers being defined between seals of the rotor with the wall bounding the trochoidal cavity) and transferred to another chamber in synchronization with the latter making its transition from its intake to its compression phase, with such transference being carried out in a manner causing substantial turbulence. The engine can optionally be operated in a diesel mode with diesel fuel injection being made at the conventional phase condition, or as a spark ignition engine with gasoline carburetion of air fed to the supercharging compression chamber being effected. Engine exhaust heat is optionally applied to compressed air or air-fuel mixture as the latter is being transferred respectively in the diesel or spark mode of engine operation. All air inlets to the engine are valved to controllably limit the effective compression ratio. Internal engine valving or porting is effected by a side of the rotor covering and uncovering openings in a side wall defining a side of the trochoidal cavity.

4 Claims, 8 Drawing Figures

ROTARY INTERNAL COMBUSTION ENGINE WITH INTEGRATED SUPERCHARGED FUEL-AIR INDUCTION

The present invention relates to new and useful improvements in rotary internal combustion engines and is a continuation-in-part of my copending application Ser. No. 944,850 filed 9/22/78 now U.S. Pat. No. 4,230,088.

The present invention has generally the same objectives as my prior application mentioned above and especially the objective of supercharging or increasing the effective compression ratio of a rotary internal combustion engine. In this and in other aspects, the instant invention seeks ends quite similar to those given and set forth in U.S. Pat. No. 3,688,749, entitled SUPERCHARGED ROTARY COMBUSTION ENGINE which issued on Sept. 5, 1972 to Felix Wankel, and reference is hereby made thereto as well as to the prior art mentioned therein for a background understanding.

In addition, the present invention has the important objective of providing means and method of utilizing the space within a single trochoidal cavity of a rotary engine to effect both a conventional four-phase internal combustion engine operating cycle and a compression of air and the use of such compressed air to supplement the air drawn into the engine during the conventional intake phase of the cycle.

Another important objective in accordance with the objective of the last paragraph is to enable selective operation of the engine in a diesel mode with the injection of a suitable diesel fuel, or in a spark ignition mode with intake air and/or air inducted for supercharging being carbureted with gasoline or its equivalent.

An objective closely related to the foregoing objectives is to enable control of the effective compression ratio in either the diesel or spark ignition modes by controllably limiting entry of intake air and/or the induction of supercharging air into the engine.

Still another important objective to be specifically enumerated is to transfer compressed air into a chamber at the threshold of its compression phase in a manner such as to promote fluid turbulence therein and to thereby cause a more efficient and complete burning of the fuel with resultant fuel conservation and diminuition of pollutent emission.

A final objective to be specifically given is to provide an engine in accordance with the above objectives to reduce the compression ratio necessary to obtain diesel operation without sustaining any reduction in volumetric efficiency by heating the supercharging air after its compression and prior to introducing it into an engine operating chamber.

A broad aspect of the invention has to do with an improved method of operating a rotary internal combustion engine of the type wherein a multicusped rotor rotatable upon a rotatable eccentric rotates within a cavity bounded by a wall of lobed trochoidal configuration with which the rotor cusps have sealing engagement separating and defining operating chambers in the cavity about the rotor between adjacent pairs of cusps, with such chambers being angularly spaced about and orbiting the center of the cavity as the rotor rotates while each chamber alternately expands and contracts in volume; said method comprising cyclically operating each chamber through a sequence of six phases that are synchronized with three successive increases and decreases in the volume of such chamber, with the first four phases being an internal combustion engine power cycle comprising an air intake phase, a compression phase, a combustion phase and an exhaust phase, and with the fifth phase comprising inducting air into the chamber, and the sixth phase comprising compressing the inducted air in such chamber while forcing the same into another chamber intermediate operation of the latter in its intake and compression phases.

Another broad aspect of the invention involves a rotary internal combustion engine of the type wherein a multicusped rotor rotatable upon a rotatable eccentric rotates within a cavity bounded by a wall of lobed trochoidal configuration with which the rotor cusps have sealing engagement separating and defining operating chambers in the cavity about the rotor between adjacent pairs of cusps, with such chambers being angularly spaced about and orbiting the center of the cavity as the rotor rotates while each chamber alternately expands and contracts in volume, the improvement comprising means for cyclically operating each chamber through a sequence of six phases that are synchronized with three successive increases and decreases in the volume of such chamber, with the first four of phases being an internal combustion engine power cycle comprising an intake phase, a compression phase, a combustion phase and an exhaust phase, with such means including the provision of means for effecting the induction of air into such chamber during the fifth phase and for effecting the compresion of and the forcing of induced air into another chamber intermediate the first and second phases of the latter.

The principles of the invention, its construction, operation and advantages will be most readily appreciated in the light of the ensuing description of a preferred embodiment of the invention that is presented in conjunction with the accompanying drawings, wherein.

Figure 1:
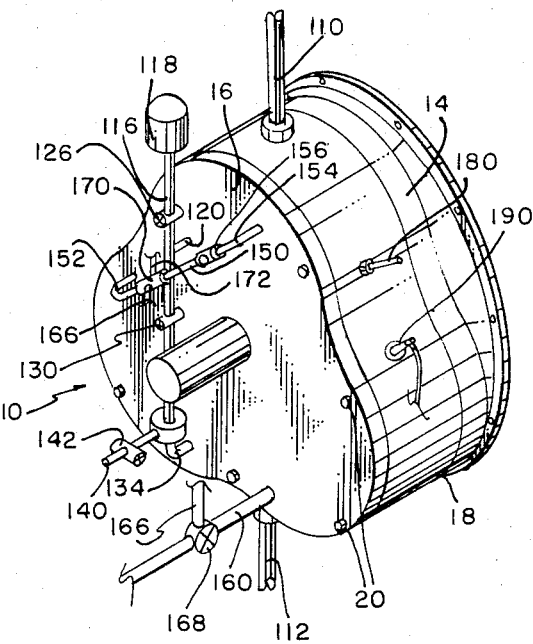
FIG. 1 is an isometric view of the rotary internal combustion engine of this invention with portions being broken away to reveal hidden parts.

Referring now to the drawings wherein like numerals designate like parts throughout the various views, the rotary engine of this invention is designated generally at 10, the same comprising a trochoidal housing 12 constituted of a pair of axially spaced end walls 14 and 16 that sealingly abut an intervening wall 18, with the walls 14–18 being joined by circumferentially spaced threaded means in the form of headed bolts so that slidably extend through suitably aligned apertures in the walls 16 and 18 and with the bolt ends being threaded into threaded recesses 22 in the wall 14.

Figure 2:
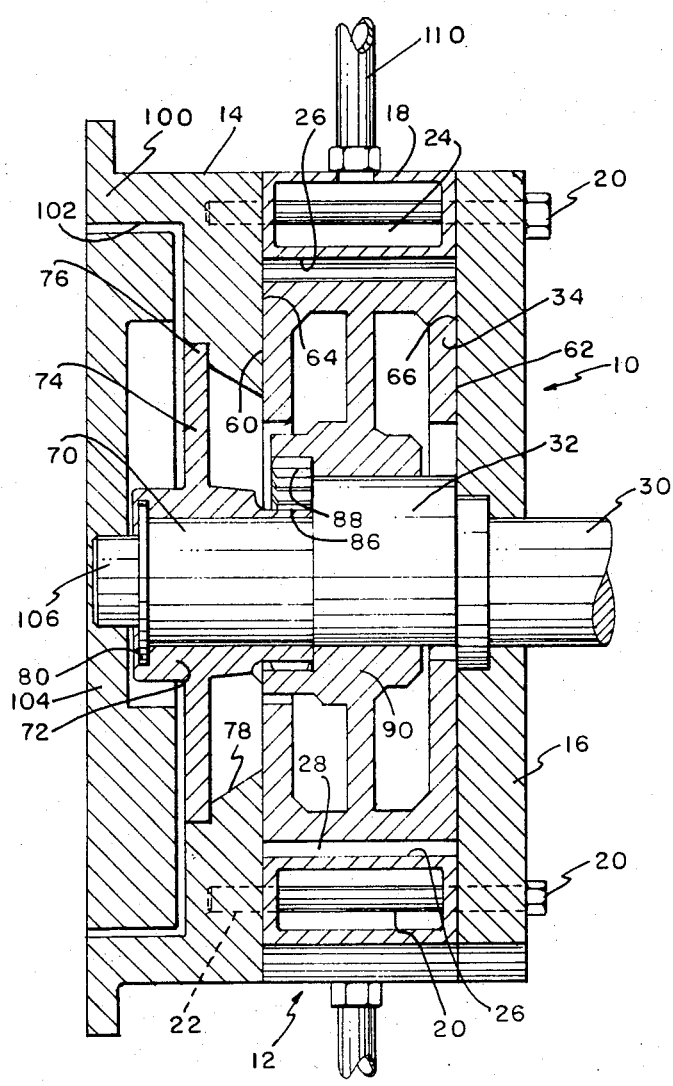
FIG. 2 is an enlarged vertical sectional view coincident with the central axis of the engine, with certain hidden details being shown in dashed outline.
Figure 3:
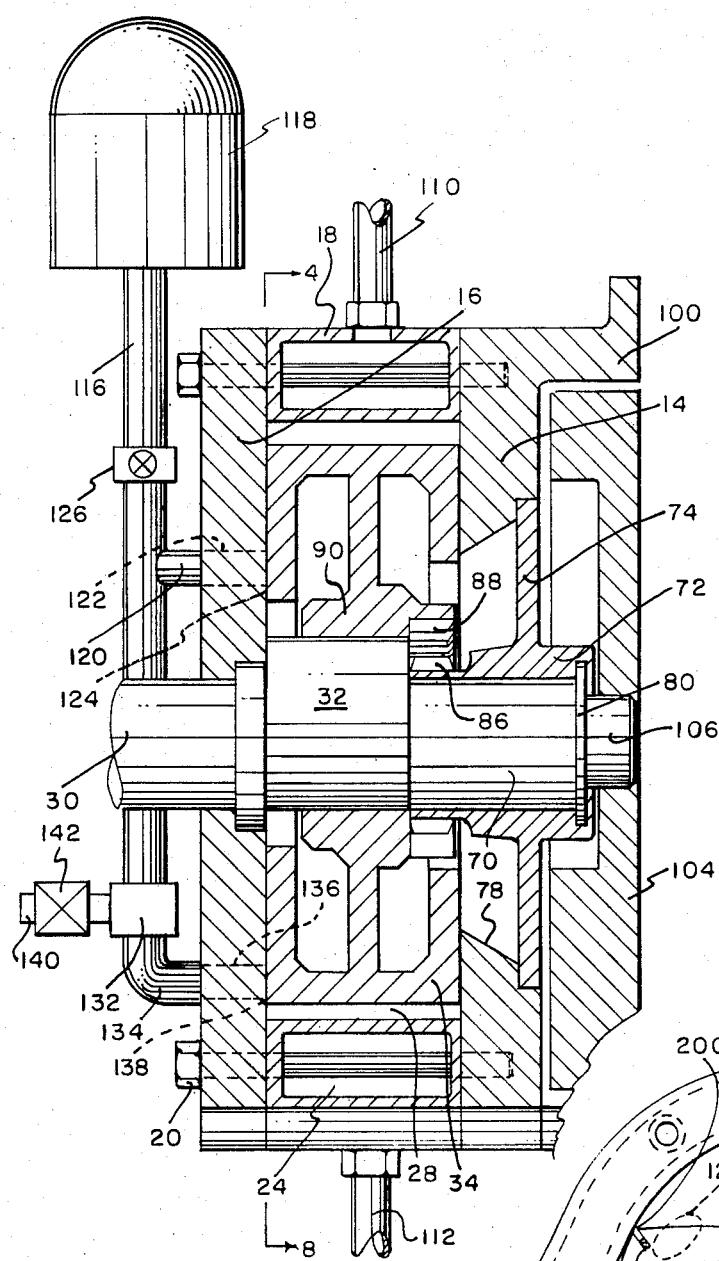
FIG. 3 is a sectional view taken in the opposite direction to that of FIG. 2, with hidden details being shown in dashed outline, and with the supercharger transfer line being omitted.

The wall 18 is hollow as shown in FIGS. 2 and 3 to afford a liquid coolant circulation space 24 and thus enable the wall 18 to serve a cooling jacket function. The wall 18 has an inner surface 26 of a trochoidal configuration so as to define a three-lobed trochoidal cavity 28 within the housing 12, such cavity 28 being best shown in FIGS. 4, 5 and 6.

Figure 4:
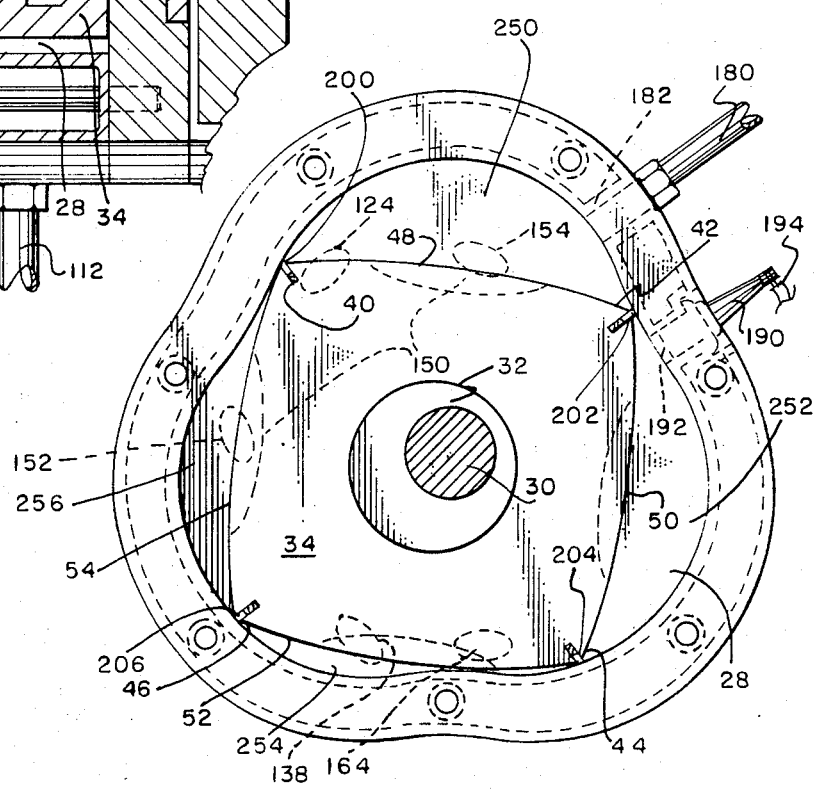
FIG. 4 is a transverse sectional view that is partially of semischematic character taken at the juncture of the ported end wall and the rotor as indicated by the section line 4—4 in FIG. 3, with certain other hidden details being shown in dashed outline, the drawing being schematic in that the relative positions of ports rather than the ports themselves are shown in dashed outline.
Figure 5:
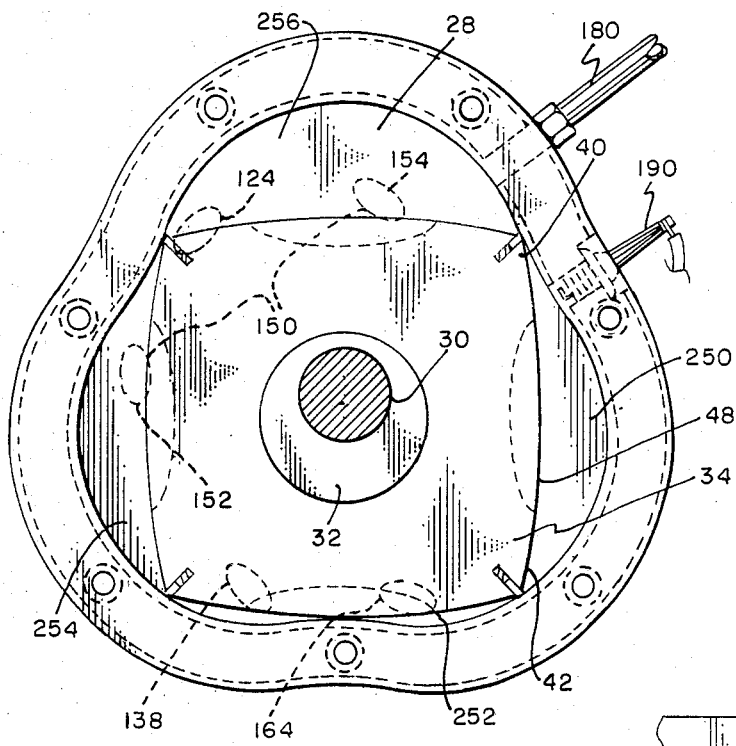
FIGS. 5 and 6 are similar to FIG. 4 and serve to show the rotor in differing positions.
Figure 6:
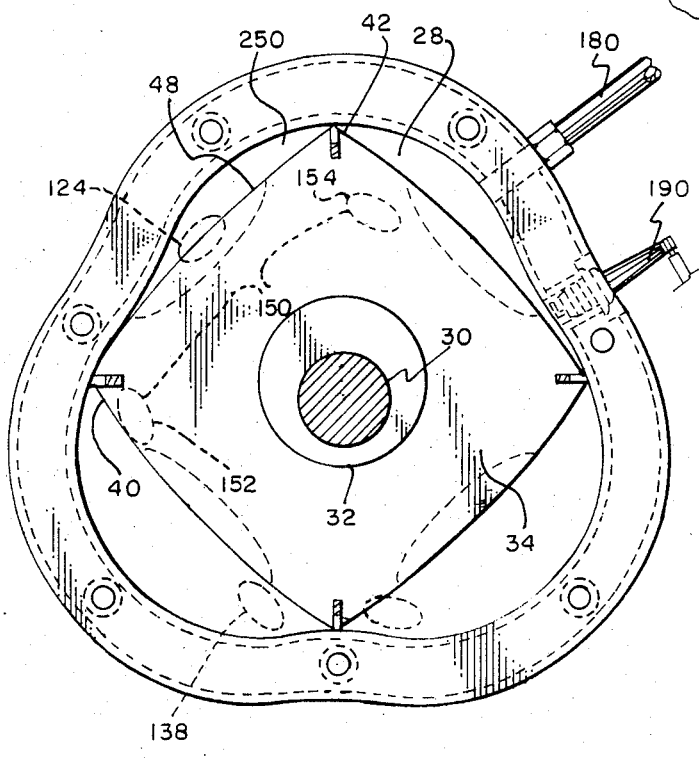

A shaft 30 is journaled through the end wall 16 and is, along its axial extent through the cavity 28, formed as an eccentric 32 on which is rotatably mounted within the cavity 28 a rotor 34 having a profile of approximately the inner envelope of the wall 18 defining the three-lobed cavity 28, that is, a generally square configuration with four cusps or apices portions 40, 42, 44 and 46 with somewhat arcuate and indented sides 48, 50, 52 and 54 between successive pairs of such cusps as shown in FIGS. 4, 5 and 6. As in the above mentioned Wankel patent, a sleeve bearing (not shown) as may be interposed between the eccentric 32 and the rotor 34. The axial extent of the rotor 34 is such that the axially opposite faces 60 and 62 thereof make sliding and sealing contact with the adjacent parallel and planar sides 64 and 66 of the walls 14 and 16.

Though not so shown, it will be evident that the faces 60 and 62 of the rotor can be provided with conventional oil seals to enhance the sealing relative to the wall sides 64 and 66.

The shaft 30 includes a cylrindical portion 70 that is journaled through a sleeve 72 that is fixed in position by a central radial extension 74 thereof that has its circular periphery 76 fixedly secured to the wall 14 within an opening 78 through the latter. A sleeve bearing, not shown, can be employed between the shaft portion 70 and the sleeve 72, and suitable sealing means 80 can be employed to prevent fluid leakage through the bearing as well as to limit end play of the shaft 30.

The end of the sleeve 70 nearest the eccentric 32 is a pinion gear 86 that meshes with a ring gear 88, such gears being in a 3:4 ratio. As clearly shown, the ring gear 88 is integral with the hub portion 90 of the rotor 34.

The flanged circular periphery 100 of the flanged end wall 14 extends axially to define a cavity or recess 102 in which a disklike fly wheel 104 is diposed, the latter being centrally fixed upon a reduced end portion 106 of the shaft 30. As inspection will readily reveal, the flywheel 104 is asymmetric in configuration so as to serve as counterweight to the eccentric 32 and the rotor 34 as well as a flywheel.

In view of the considerable degree of similarity of the structure thus far described to well known prior art such as exemplified by the previously mentioned Wankel patent, no need is seen for nor would any useful purpose seem to be served by further discussion of the structure thus far set forth.

Referring to FIG. 1, liquid coolant is forced into the space 24 within the wall 18 through a pipe 110, and after passing down and around both sides of the engine, such liquid coolant discharges through a pipe 112 for cooling in a radiator or the like, not shown, and its pumped return to the engine through the pipe 110.

Air is supplied to the engine 10 through a pipe 116 having an air cleaner 118 at its inlet end. The pipe 116 has a branch 120 that supplies intake air for the engine in the intake phase of the four-phase power cycle of the engine 10 in a manner somewhat analogous to that of conventional trochoidal engines that are not supercharged. The air pipe branch 120 is connected to the engine cavity 28 by an opening 122 with the cavity 28 is termed the air intake port 124. The location of the port 124 and its departure from a circular configuration will be subsequently described.

Air flow to the branch 120 is subject to limitation by a control valve 126. Optionally, air flow in the pipe 116 is subject to further control by a control valve 130 disposed intermediate the branch 120 and a carburetor 132. The carburetor 132 is connected to the engine cavity 28 via an elbow 134 and an opening 136 through the wall 16, with the juncture 138 of the opening and the cavity 28 being termed the supercharger air inlet port for air inducted into the engine 10 for supercharging the latter.

When the engine is operated in a spark ignition mode, fuel, such as gasoline or the like, can be introduced into the engine in a manner somewhat analogous to conventional engines by incorporating a fuel supplied carburetor, not shown, in the branch 120; however, in the illustrated and preferred construction, gasoline, alcohol, propane or any sort of fuel ordinarily used for spark ignition engines is introduced to the carburetor 132 through a line provided with a control valve 142. Fuel introduced into the carburetor 132 commingles with air entering the engine through the port 138 in proportions subject to control by the valves 126, 130 and 142.

Means is provided for transferring air or the air and fuel introduced through the port 138 after its compression to another part of the engine (for a purpose to be presently described), such means comprising a transfer pipe 150 having one end in communication through the wall 16 to the cavity 28 at a compressor outlet port 152 and its other end in communication through the wall 16 to the cavity 28 at a supercharging port 154. The purpose for such transfer as well as the shapes of and location of the ports 152 and 154 will be detailed subsequently. For a reason that will become apparent, a check or unidirectional valve 156 is provided in the transfer pipe 150 that will prevent flow therein from the port 154 to the port 152 while permitting flow in the opposite direction.

An exhaust pipe 160 communicates with the engine cavity 28 through the end wall 16 and an exhaust port 164. As in the case of the other ports, the shape and location of the exhaust port will be subsequently explained. The exhaust pipe 16 is provided with a branch 166 to which a controllable proportion of the engine exhaust can be diverted by a diversion valve 168. The purpose of the exhaust branch 166 and the valve 168 is to supply a controllable proportion of waste exhaust heat to the air or fuel-air mixture passing through the transfer pipe 150. The application of such heat is effected by a heat exchange jacket 170 disposed about the pipe 120 to which hot exhaust gases are supplied by the exhaust branch pipe 166, with gases exiting from the jacket 170 via a discharge pipe 172.

For use during operation of the engine 10 in its diesel mode, the same is provided with a diesel fuel supply line 180 that is connected through the wall 18 to a fuel injection nozzle 182 for spraying fuel into the cavity 28. Conventional means, not shown, connect the shaft 30 to the line 180 for injecting metered quantities of fuel into the line 180 and cavity 28.

For use during operation of the engine in its spark ignition mode the same is provided with a spark plug 190 that extends through the wall 18 to expose its spark electrodes 192 to the cavity 28. An ignition wire 194 is connected to the spark plug 190, with conventional means, not shown, being provided that are connected to the shaft 30 for supplying an electrical voltage pulse to the spark plug 190.

The diesel mode and spark ignition mode respectively require four injections and four voltage pulses per revolution of the rotor 34 as will become evident.

Figure 7:
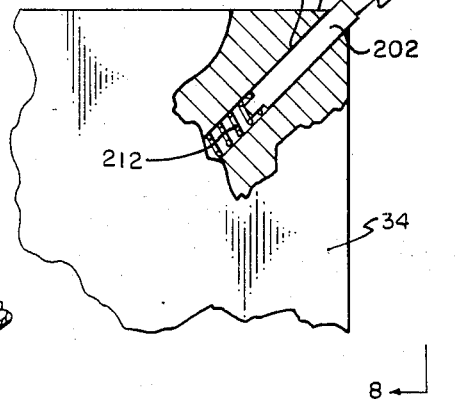
FIG. 7 is an enlarged detail view, partly in section, illustrating the sealing means at the rotor cusps; and, FIG. 8 is a fragmentary elevational view of the structure shown in FIG. 7, the view being taken from the plane of the line 8—8 in FIG. 7.
Figure 8:
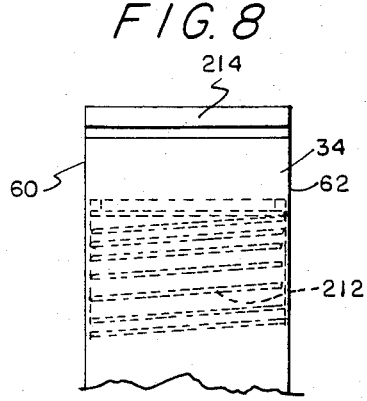

The cusps 40, 42, 44 and 46 of the rotor 34 are disposed in closed proximity to the inner surface 26 of the wall 18, with sealing means 200, 202, 204 and 206 being respectively provided to make improved and longer lasting or wearing sliding fluid seals therebetween. As best shown in FIGS. 7 and 8 with respect to the sealing means 202 representative thereof, the rotor 34 is provided with a radial slot 210 that extends in its radially outmost extent from face 60 to face 62 of the rotor. The radially innermost extent of the slot 210 has a lesser axial extent than the spacing of the faces 60 and 62, and a zigzag type of leaf spring 212 is disposed or seated in such innermost portion of the slot 210 so as to urge radially outward a wiper or sealing block 214 that is slidingly disposed in the slot 210 into sliding and sealing engagement with the inner surface 26 of the wall 18. The block 214 can be any suitable alloy incorporating a lubricant.

With reference to FIGS. 4, 5 and 6, it will be evident that the rotor side 48 and the portion of the wall 18 between the seals 200 and 202 define a chamber 250 that orbits the axis of the shaft 30 as the rotor 34 rotates, such chamber 250 being closed except for porting thereof to be presently described on it being recalled that the axial end or faces 60 and 62 make sealing engagement with the end walls 14 and 16 so as to preclude fluid communication being similar chambers 252, 254 and 256 analogously defined relative to rotor sides 50, 52 and 54 as well as to preclude passage of fluids from the chambers radially inwardly of the periphery of the rotor 34.

For reasons of symmetry, the sequence of porting of the chambers 250, 252, 254 and 256 are identical to each other and the same is manifestly such that the sequences are 90° out of phase with each other because of the geometry involved. More specifically, assuming clockwise rotation of the rotor 34 as viewed in FIGS. 4, 5 and 6, the porting of the chamber 256 trails that of chamber 250 by 90° of rotor rotation, with chamber 254 trailing chamber 256 by 90° of rotation. Similarly, the porting of chamber 252 trails that of chamber 254 by 90° of rotation, and chamber 250 trails that of chamber 252 by 90° of rotation.

It will be evident to those familiar with the operation of Wankel engines involving a three-lobed trochoidal cavity and a four-sided rotor that each of the chambers 250, 252, 254 and 256 expands and contracts in volume three times during each complete revolution of the rotor 34.

During the ensuing description of the operation of the engine 10, it will be seen that of such three expansions and contractions in volume, two of such expansions and contractions are such as to be quite analogous in utilization to the utilization of two successive expansions and contractions in conventional four-stroke cycle piston engine, while the remaining expansion and contraction is utilized to induct air (or air and fuel) and thence compress the same for transference to another chamber (the one preceding it by 90° in phase) as the latter is about at the end of its intake phase.

It is to be understood that the only fluid communication that occurs through the ports 124, 152, 138, 154 and 164 is solely with the chambers 250, 252, 254 and 256, and the term "porting" is used with respect to such fluid communication as is controlled by such ports being opened, covered or closed, and partly covered or closed by the face 62 of the rotor 34.

A description of the porting of the chamber 250 during a complete rotation of the rotor 34 will suffice for all. A complete cycle of operation of the chamber 250 in terms of degrees of rotor rotation may be as follows (with the exact end points of port openings being determined by port placement and the intermediate extents of opening being determined by the shape of the ports):

Open to intake port 124 from about 345° to about 50 degrees.

Open to supercharging port 154 from about 40 degrees to about 75 degrees.

Open to exhaust port 164 from about 170 degrees to about 230 degrees.

Open to the inductance inlet port 138 from about 235 degrees to about 294 degrees.

Open to the compressor outlet port 152 from about 280 degrees to about 345 degrees.

It will be noted that the first two listed angular intervals overlap somewhat. Such provision and the extent thereof is a matter of engineering choice and takes into account allowing for the inertia of the intake air so as to optimize the quantity of intake air before closing the port 124 against further flow.

Similarly the last two of the listed angular intervals overlap to take advantage of the inertia of air flow so as to optimize the quantity of air inducted.

The above listed angular intervals are related to the expansions and contractions of the chamber 250 are approximately as follows. The chamber 250 expands in volume during the angular intervals 345° to 45°, 105° to 165°, and from 225° to 285°. Contraction intervals are 45° to 105°, 165° to 225°, and from 285° to 345°.

FIGS. 4, 5 and 6 respectively display the chamber 250 approximately at angular positions of 53°, 132° and 0° in relation to the previously listed angular intervals.

From the foregoing, it will be seen that the same trochoidal cavity volume can be efficiently employed for both a four-phase engine operation with each compression phase thereof operating to compress both normal intake air and air separately compressed and added thereto. No separate pump or cavity is required.

The engine 10 can be started on gasoline in a conventional manner using an ordinary starter (not shown) when in either diesel or spark ignition mode, though more easily especially in cold weather, in the latter mode. After starting in the spark ignition mode and after the engine is warm and running at speed the engine can be changed over into the diesel mode by closing the valve 142 and starting the diesel fuel injections. Energization of the spark plug 190 may be discontinued on going to the diesel mode.

Compressed air (or air and fuel) entering the chamber 250 causes such transverse turbulence in the chamber during the ensuing compression as to enhance the mixing and dispersion of gasoline in the spark ignition mode as to improve the quality of the combustion. Such turbulence persists sufficiently as to improve the dispersion of injected diesel fuel and the combustion thereof. Greater fuel economy and a reduction in emission of pollutents is to be anticipated.

The angular positions of the injector 180 and the spark plug 190 and the timing of their activation are matters of engineering choice and are preferably such as to initiate firing when the chambers involved are at or near their minimum volumes.

As mentioned previously, the ports need not be circular, and can be givn shapes to make the rate of opening and closing relative to angular position of the rotor 34 in accordance with engineering choice. In this regard, for example, a circular port will give more abrupt openings and closings, whereas a properly oriented elliptical port will give a more tapered or gradual initial opening or closing. As shown in FIGS. 4, 5 and 6, it is preferred that the ports of the engine 10 be of elliptical configuration, but again such is largely a matter of engineering choice.

The air control valves afford significant control over the effective compression ratio of the engine.

The heating of the air or fuel-air mixture in the transfer pipe 150 does not adversely effect the volumetric efficiency as the effected fluid has already been isolated or sequestered, while contributing to the vaporization of fuel in the spark ignition mode, and while making it possible to obtain diesel mode operation with reduced compression ratios. The latter advantage makes it possible to realize a lighter weight and/or longer lasting engine for a given power rating or power capability.

It should be readily recognized by those conversant in the art that the principles of the present invention afford great flexibility and freedom of engineering design choice as to the placement of and the shape and size of the various ports to realize desired angular ranges and the variation of the percent of port opened with respect to a particular chamber as a function of angular movement of the rotor.

The illustrated form of the invention involves an epitrochoidal cavity of three lobes which is believed preferable to other of such class of cavities having more than three lobes such as, for example, six lobes and necessitate a seven-sided rotor and a corresponding number of chambers. Such an engine would, with appropriate portion, effect two-power phases for each chamber during a single complete rotation of the rotor.

Epitrochoidal cavities appear to be preferable to hypotrochoidal cavities as the direction of rotation of the rotor is the same as that of the eccentric, whereas the opposite is true in the case of the hypotrochoidal which does not lend itself as readily to gearing the rotor to the shaft to establish the necessary relationship. In the case of a three-lobed hypotrocoidal cavity, two chambers (two-sided rotor) would be employed and the eccentric would revolve twice the speed of the the rotor, but in the opposite direction. Similarly, a six-lobed hypotrochoidal would require a five-sided rotor and the eccentric would rotate five times the rate of the rotor, but in the opposite direction.

Having fully described the preferred embodiment of the invention and the various preferred methods of operation, attention is now directed to the appended claims so that the actual scope of the invention may be ascertained.

I claim:

1. An improved method of operating a rotary internal combustion engine of the type wherein a multicusped rotor rotatable upon a rotatable eccentric rotates within a cavity bounded by a wall of lobed trochoidal configuration with which the rotor cusps have sealing engagement separating and defining operating chambers in the cavity about the rotor between adjacent pairs of cusps, with such chambers being angularly spaced about and orbiting the center of the cavity as the rotor rotates while each chamber alternately expands and contracts in volume; said method comprising cyclically operating each chamber through a sequence of six phases that are synchronized with three successive increases and decreases in the volume of such chamber, with the first four phases being an internal combustion engine power cycle comprising an air intake phase, a compression phase, a combustion phase and an exhust phase, and with the fifth phase comprising inducting air into the chamber, and the sixth phase comprising compressing the inducted air in such chamber and passing such inducted and compressed air through an elongated transfer zone along a path that is for an intermediate portion of its extent laterally isolated from the cavity into another chamber intermediate operation of the latter in its intake and compression phases, with said chamber being separated from said another chamber by a single cusp engaging the wall with the chamber immediately trailing the orbit of said another chamber about the center of the cavity, whereby the operation of said chamber in it sixth phase occurs at a time during which the chamber next preceding it in orbit is being operated in its first phase, and wherein the induced and compressed air is passed into said another chamber during a continuous interval during which said another chamber orbits at least 24 degrees and during which interval said another chamber has at least in part entered upon its compression phase of operation.

2. The method of claim 1, wherein the number of cusps exceeds the number of wall lobes by one.

3. The method of claim 2, wherein the number of cusps is four and the number of wall lobes is three to result in said chamber increasing and decreasing in volume three times during each complete orbit of the chamber, whereby the six phases of operation of each chamber is cyclically effected once during each complete orbit of such chamber.

4. In a rotary internal combustion engine of the type wherein a multicusped rotor rotates upon an eccentric that is mounted for rotation about an axis at the center of a cavity radially bounded by a multilobed wall of a trochoidal configuration with which the rotor cusps have sealing contact, with the cavity being axially bounded by spaced end walls, with a plurality of circumferentially spaced chambers being defined within the cavity about the rotor and isolated from each other by means effecting a sealing contact between the rotor cusps and the trochoidal wall and by means effecting sealing contact of the axial ends of rotor with the side walls, whereby each chamber alternately increases and decreases in volume during rotation of the rotor, the improvement comprising said side walls being provided with a plurality of ports spaced radially inwardly of the trochoidal wall that communicate axially with the cavity comprising an air inlet port, a pressurized air inlet port, an exhaust port, an air induction port, and a pressurized air outlet port, conduit means outside the cavity affording fluid communication between the pressurized air outlet and inlet ports, said conduit means being laterally isolated intermediate its ends from the cavity, each of said ports being diposed as to be alternately opened and closed during rotation of the rotor against fluid communication with the chambers by said means effecting sealing contact of the axial ends of the rotor and said side walls, the arrangement being such that each chamber is cycled in synchronism with the increases and decreases in volume thereof to sequentially be opened to communicate with the ports in the order of the aforegoing recital thereof, said rotor having four cusps and the trochoidal wall having three lobes whereby four chambers are defined with each increasing and decreasing three times during each rotation of the rotor, and wherein from an initial position in a 360° cycle of rotation of the rotor, one of the chambers is open to the intake port from about 345° to about 50° to the pressurized air inlet port from about 40° to about 75°, to the exhaust port from about 170° to about 230°, to the air induction port from about 235 to about 294, and to the pressurized air outlet port from about 280° to about 345°, with the chamber having one of its three-volume maximums at about 45°.

* * * * *